No. 679,523. Patented July 30, 1901.
F. W. ATWELL.
CLEVIS.
(Application filed Dec. 13, 1900.)
(No Model.)
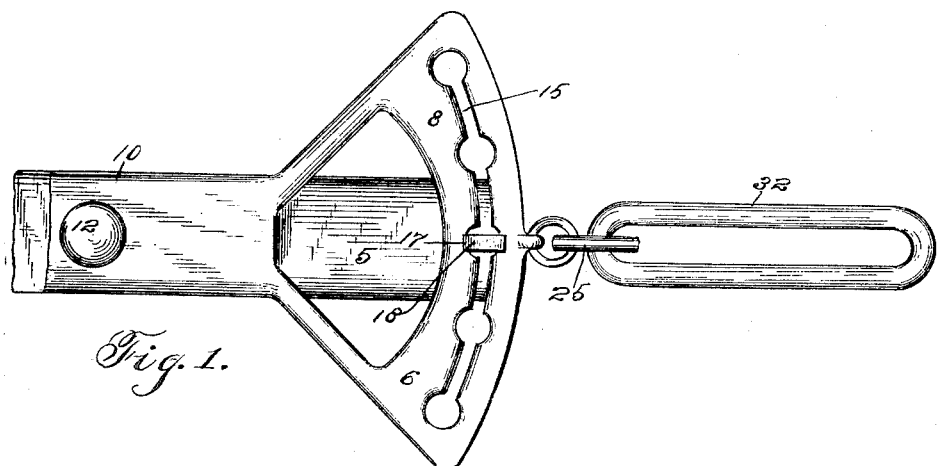
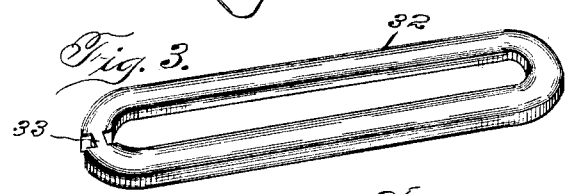
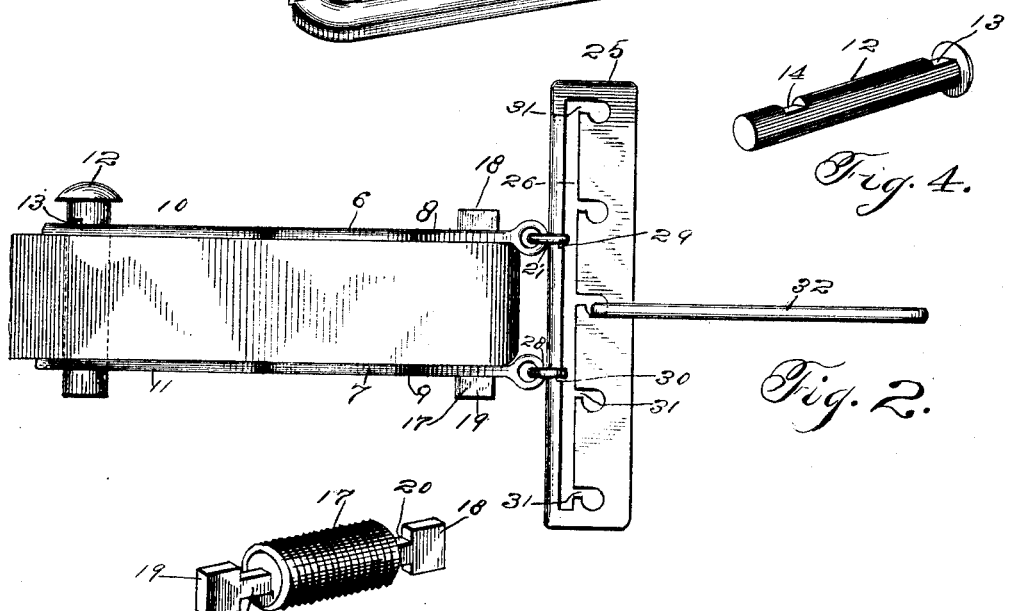
Witnesses
Fred E. Maynard.
Geo. H. Chandlee.
F. W. Atwell, Inventor.
by C. A. Snow & Co.
Attorneys

UNITED STATES PATENT OFFICE.

FRED W. ATWELL, OF FOXLAKE, ILLINOIS.

CLEVIS.

SPECIFICATION forming part of Letters Patent No. 679,523, dated July 30, 1901.

Application filed December 13, 1900. Serial No. 39,757. (No model.)

*To all whom it may concern:*

Be it known that I, FRED W. ATWELL, a citizen of the United States, residing at Foxlake, in the county of Lake and State of Illinois, have invented a new and useful Clevis, of which the following is a specification.

This invention relates to clevises as used in connection with plows; and the object of the invention is to provide a simple and efficient construction which will permit of adjustment of the singletree to the plow-beam in such manner as the effect a deep or shallow cut or furrow and to vary the width of the furrow as desired.

Further objects and advantages of the invention will be evident from the following description.

In the drawings forming a portion of this specification, and in which like numerals of reference indicate similar parts in the several views, Figure 1 is a top plan view showing the front portion of a plow-beam with the present construction attached thereto. Fig. 2 is a side elevation of the parts shown in Fig. 1 of the drawings. Fig. 3 is a perspective view of the link through the medium of which the singletree is attached to the clevis. Fig. 4 is a detail perspective view showing the pivot-bolt for those members of the structure that are mounted directly on the plow-beam. Fig. 5 is a perspective view showing the locking-bolt or screw which holds the members on the beam against pivotal movement.

Referring now to the drawings, the plow-beam is shown at 5, and on the upper and lower faces of this beam are mounted two plates 6 and 7, including segmental head portions 8 and 9 and stems 10 and 11, the stem portions being pivoted near their rear ends by means of a pivot pin or bolt 12, which is passed through alining perforations in the stems and beam. This pin or bolt has transverse recesses 13 and 14 at one side, which are so positioned that after the pin is in place these recesses may lie at the rear side of the pin and the plates may be drawn forwardly to engage them with the recesses, thus holding the plates against displacement from the beam. The bolt is headed, as shown, to prevent it from dropping entirely through the perforations. Extending transversely of the head of each of the plates and conforming to the curvature thereof is an arcuate slot 15, and centered in this slot and at intervals are formed perforations through the plate, the result being that in the sides of the slot are formed arcuate recesses disposed in pairs.

Formed vertically through the beam 5 and opening at its ends into the slots 15 of the plates is a perforation which is threaded, and engaged with these threads is a cylindrical screw 17, at the ends of which are cross-sectionally angular heads 18 and 19, connected with the body portion of the screw by necks 20 and 21, and the dimensions of the parts are such that when the screw is in place the necks may lie in the slots 15. The heads when turned to lie transversely of the beam permit of pivotal movement of the plates 6 and 7 by traveling in the arcuate slots thereof. The heads may be turned from this position only when the plates are turned to receive the necks in the perforations thereof, when the screw may be turned, as shown in Fig. 1, and will hold the plates against pivotal movement.

Connected with the plates 6 and 7 is a vertical plate 25, having a slot 26, in which are engaged rings 27 and 28, connected with the plates 6 and 7, said slot having notches 29 and 30 in the rear wall thereof to receive the rings, so that the plate will be held from sliding downwardly, and in the front wall of the slot are formed keyhole-slots 31. A drafting-ring 32 is engaged through the slot 26 and has a narrowed portion 33, which may slide in this slot. The narrowed portions of the keyhole-slots are of such widths that when the draft-ring lies horizontally it cannot be moved therethrough, but must be turned on end, and vice versa. When said ring is in engagement with the broadened portion of a keyhole-slot, it must be turned on end before it can be moved outwardly therethrough. Inasmuch as the draft position of the ring is horizontal it is held from displacement when in operation. With this construction it will be seen that the draft-ring may be raised and lowered to vary the depth of the furrow, while the plates 6 and 7 may be moved pivotally to change the angle of the plow to the furrow to vary the width of the furrow.

In practice various modifications of the specific construction shown may be made and any suitable materials and proportions may be used for the various parts without departing from the spirit of the invention.

What is claimed is—

1. A device of the class described comprising a plate mounted for lateral pivotal movement, means for holding the plate at different points of its pivotal movement, a second plate connected with the first plate and adapted to stand vertical, said second plate having a plurality of keyhole-slots therein and a longitudinal slot connecting the minor ends of the keyhole-slots, and a draft-ring engaged with the slot and having a narrowed portion for passage through the narrowed portions of the keyhole-slots into the enlarged portions thereof.

2. The combination with a plow-beam, of plates pivoted against the upper and lower faces thereof for lateral movement, said plates having alining arcuate slots having recessed walls, a locking device mounted rotatably in the beam and having its ends engaged with the slots, said ends being adapted to lie transversely of the slots and engaged with the recesses in the walls thereof to prevent movement of the plates, and a draft-ring connected with the plates.

3. The combination with a plow-beam, of plates pivoted against the upper and lower faces of the beam for lateral movement, said plates having alining arcuate slots having recesses in their walls, a locking device mounted rotatably in the beam and having its ends engaged with the slots and adapted to lie transversely thereof and engaged with the recesses to hold the plates against pivotal movement, a second plate having keyhole-slots therein and a connecting-slot, said second plate being connected with the first plate to stand vertically, and a draft-ring engaged with the last-named slot of the second plate and adapted for movement therethrough into engagement with the keyhole-slots interchangeably.

4. The combination with a beam, of plates mounted pivotally against the upper and lower faces thereof, said plates having arcuate slots having recessed walls, a locking-pin rotatably mounted in the beam and having its end portions disposed in the slots of the plates, said pin being adapted to lie with its end portions engaged with the recesses to hold the plates against pivotal movement, a second plate connected with the first plate, said second plate having keyhole-slots therein and a longitudinal slot connecting the minor ends of the keyhole-slots, and a draft-ring having a narrowed portion engaged with the longitudinal slot and adapted for movement therethrough to engage the narrowed portions of the keyhole-slots for movement therethrough to the broadened portions in which it is adapted for pivotal movement.

In testimony that I claim the foregoing as my own I have hereto affixed my signature in the presence of two witnesses.

FRED W. ATWELL.

Witnesses:
 WALTER ATWELL,
 LEE TWEED.